Inventors
Karl A. Lehmann
and Ernst Breitling

By their Attorney

Feb. 22, 1938.  K. A. LEHMANN ET AL  2,108,896
CASH REGISTER
Original Filed July 31, 1928   15 Sheets-Sheet 2

Inventors
Karl A. Lehmann
and Ernst Breitling
By
Karl Beust
their Attorney

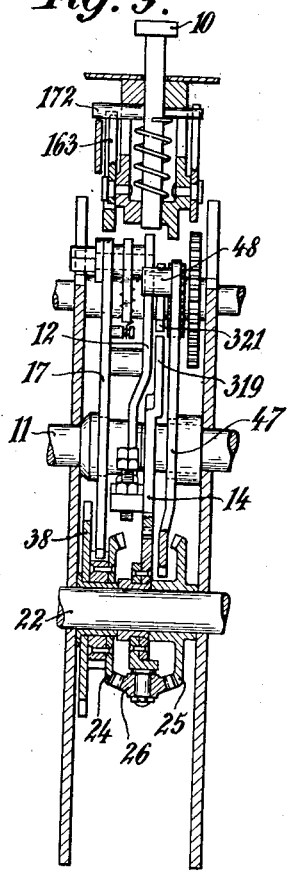
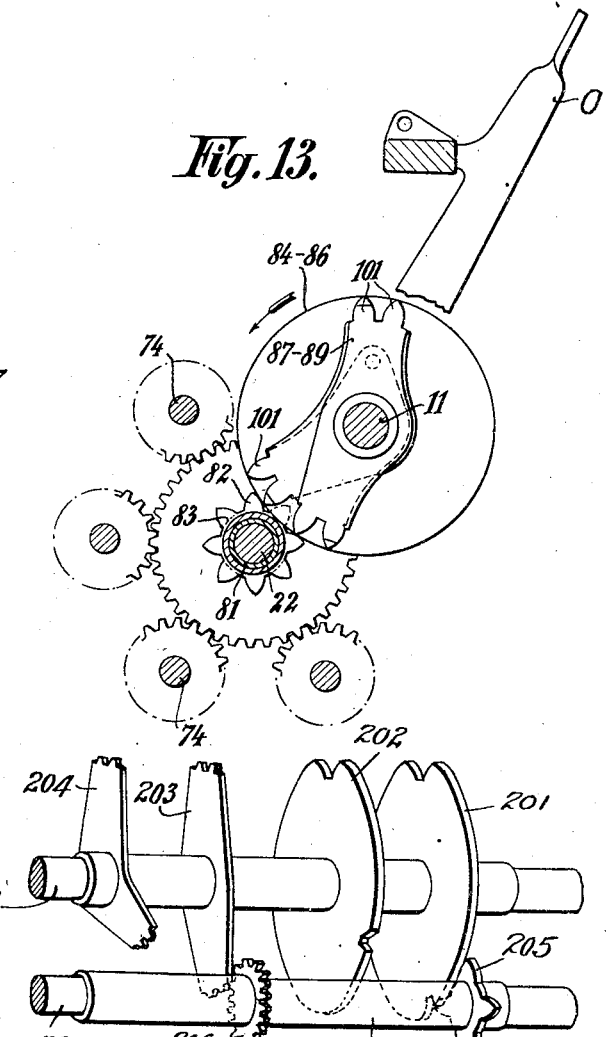
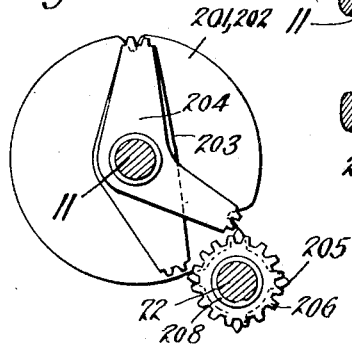

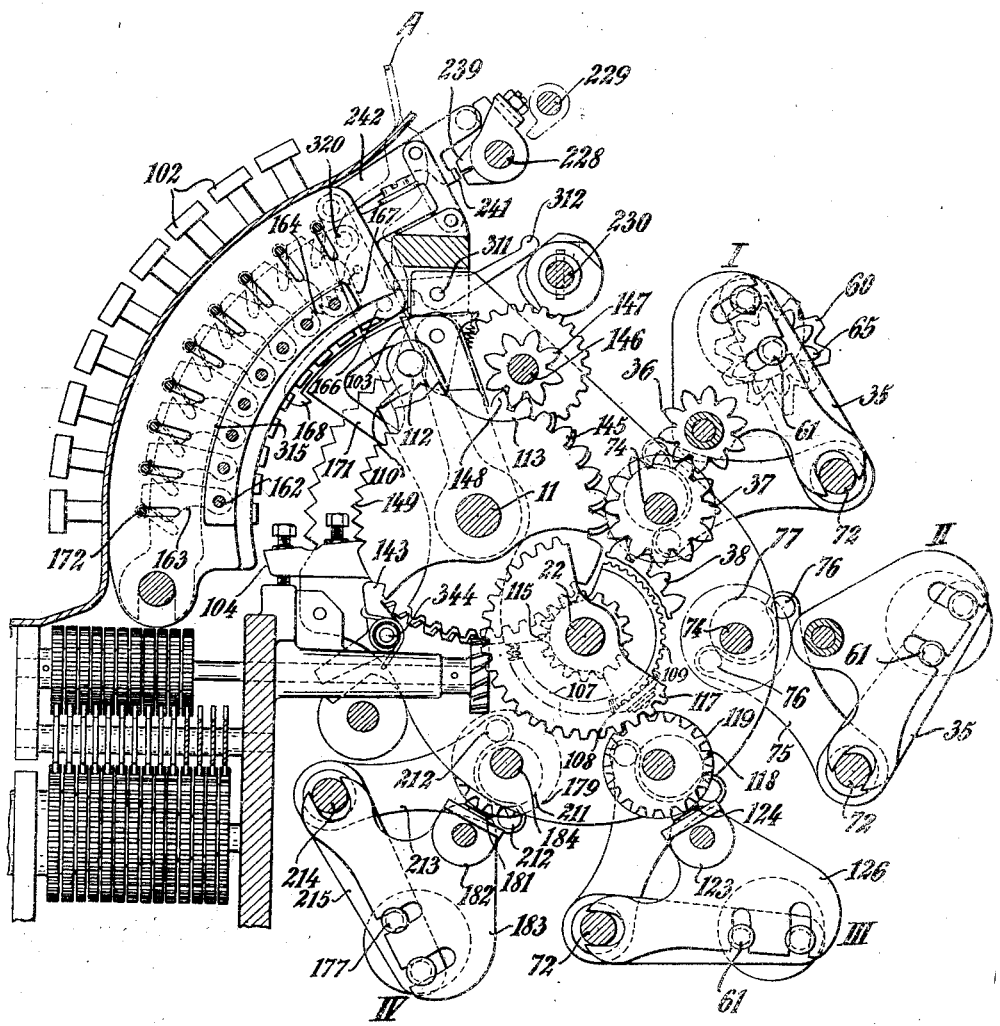

Feb. 22, 1938.   K. A. LEHMANN ET AL   2,108,896
CASH REGISTER
Original Filed July 31, 1928   15 Sheets-Sheet 8

Inventors
Karl A. Lehmann
and Ernst Breitling
By
*Karl Benst*
their Attorney

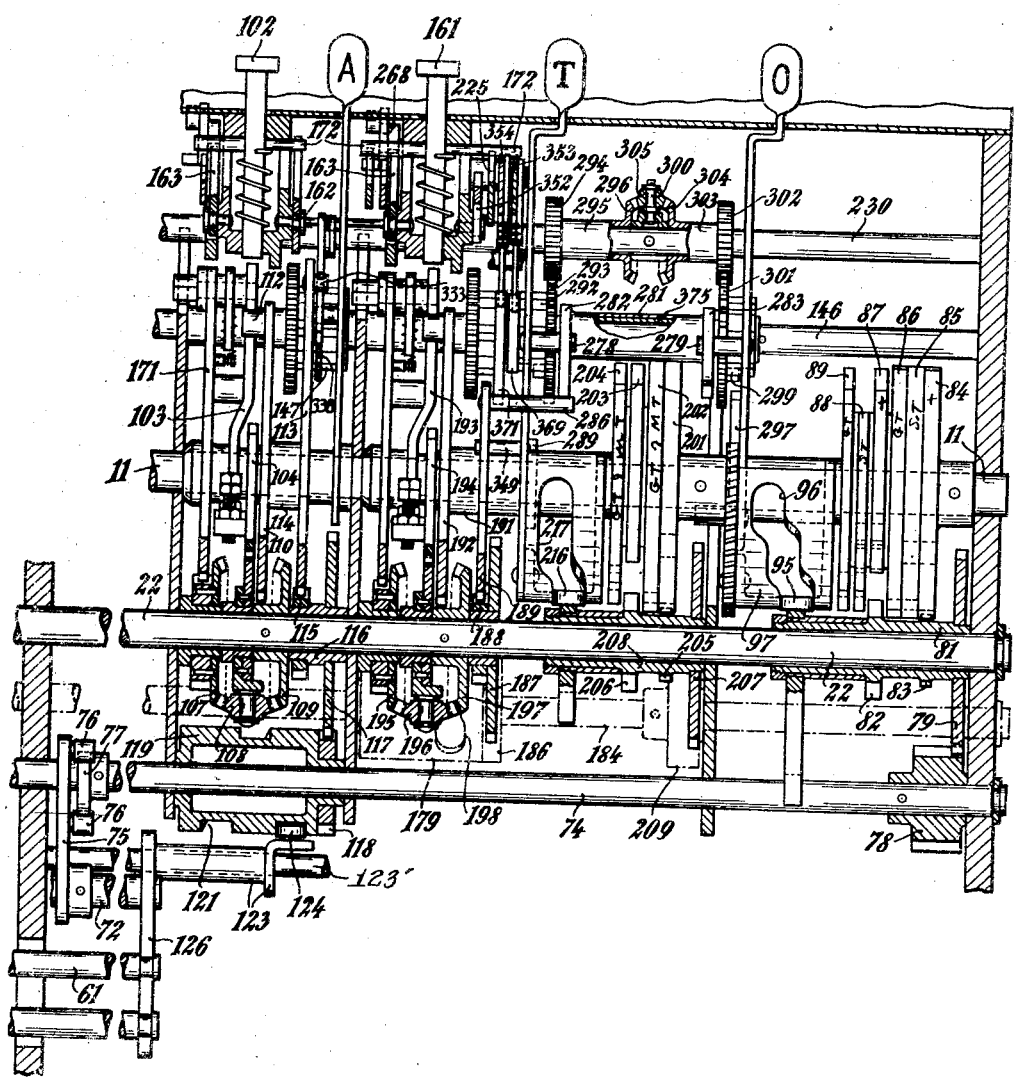

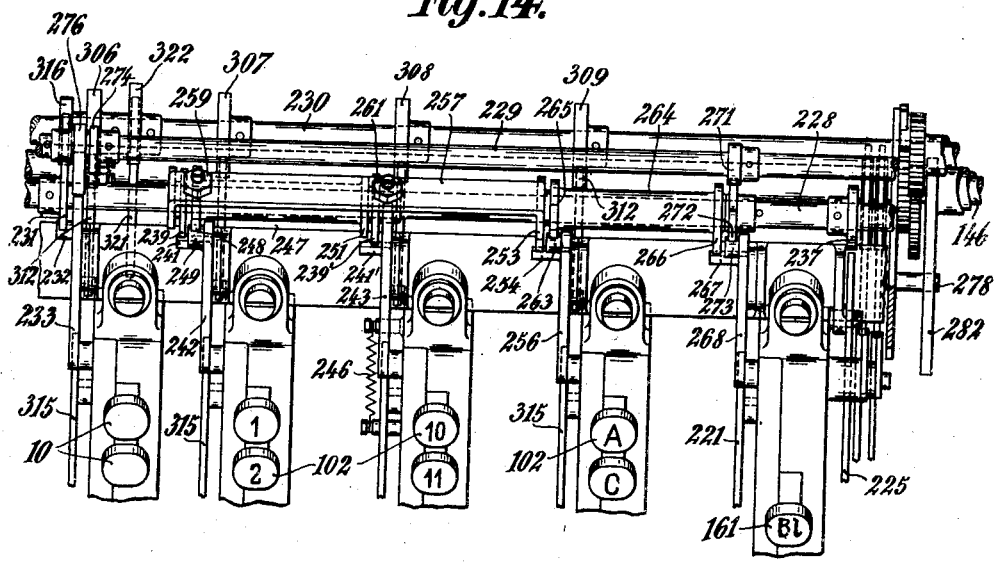

Feb. 22, 1938.  K. A. LEHMANN ET AL  2,108,896
CASH REGISTER
Original Filed July 31, 1928   15 Sheets-Sheet 11
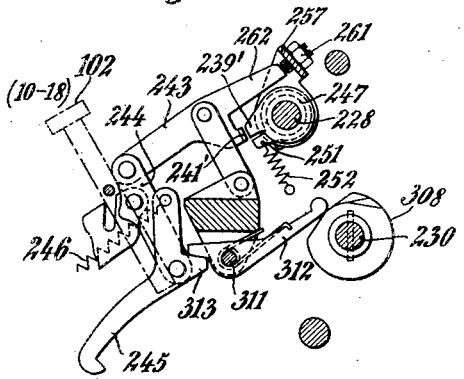
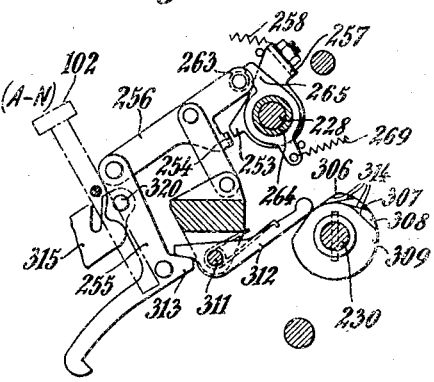
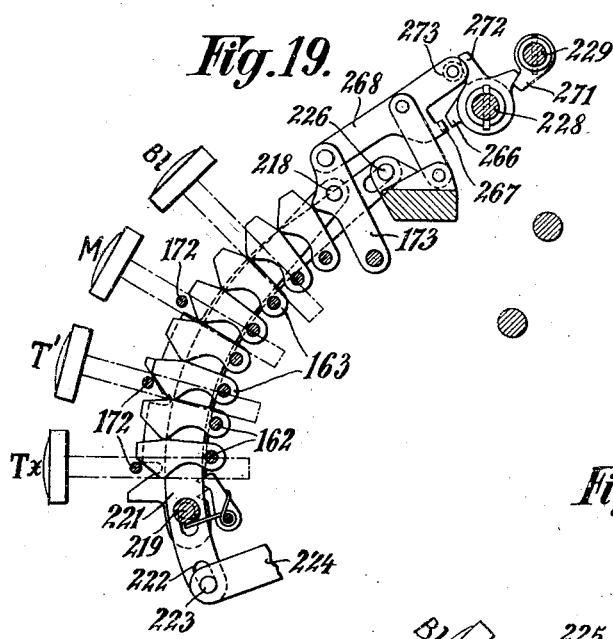
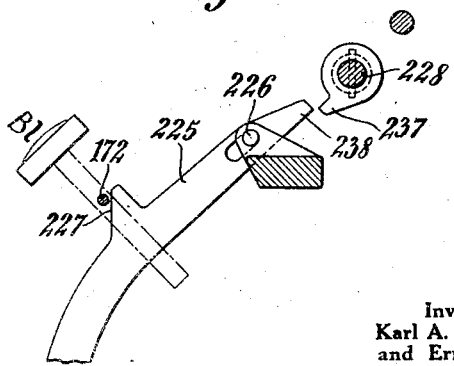
Inventors
Karl A. Lehmann
and Ernst Breitling
By Carl Benst
their Attorney Feb. 22, 1938.　　　K. A. LEHMANN ET AL　　　2,108,896
CASH REGISTER
Original Filed July 31, 1928　　15 Sheets-Sheet 12
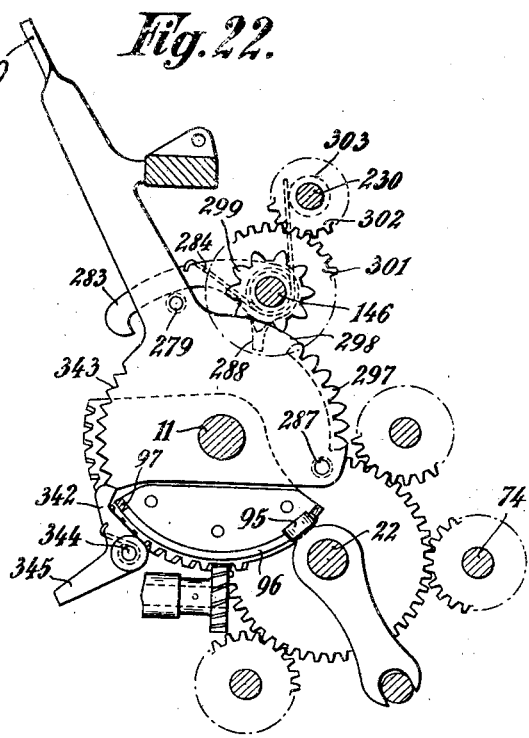
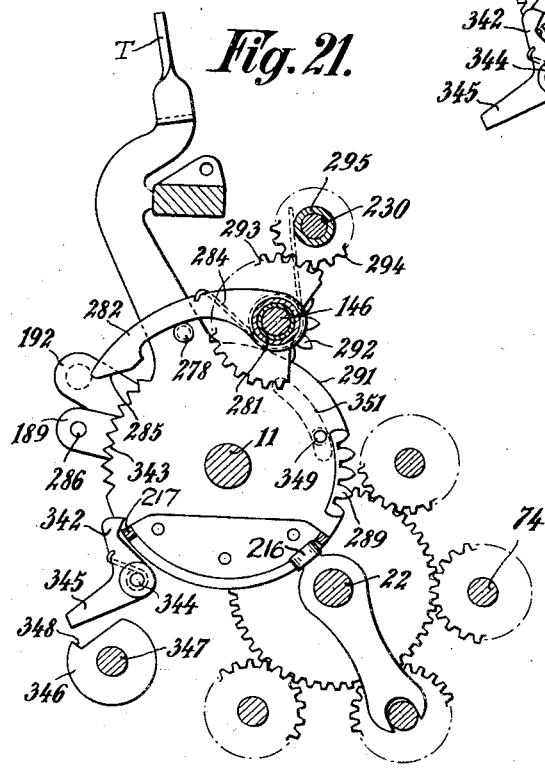
Inventors
Karl A. Lehmann
and Ernst Breitling
By
*Carl Benst*
their Attorney Feb. 22, 1938.  K. A. LEHMANN ET AL  2,108,896
CASH REGISTER
Original Filed July 31, 1928  15 Sheets-Sheet 13

Inventors
Karl A. Lehmann
and Ernst Breitling
By Carl Benst
their Attorney

Feb. 22, 1938.　　　K. A. LEHMANN ET AL　　　2,108,896
CASH REGISTER
Original Filed July 31, 1928　　15 Sheets-Sheet 14

Inventors
Karl A. Lehmann
and Ernst Breitling
By
Carl Benst
their Attorney

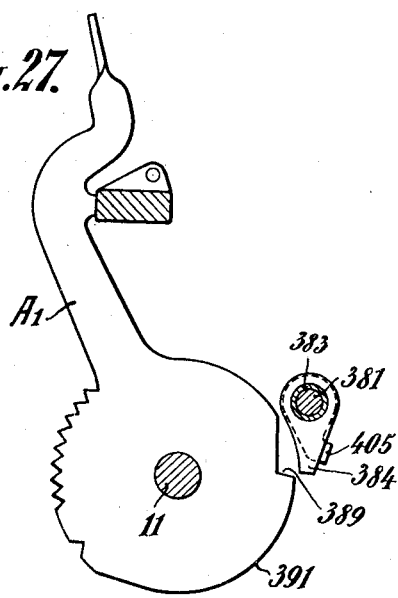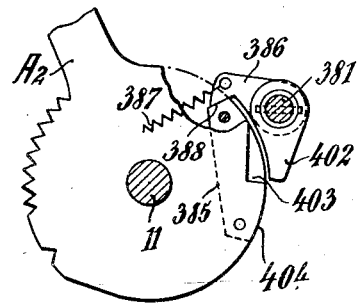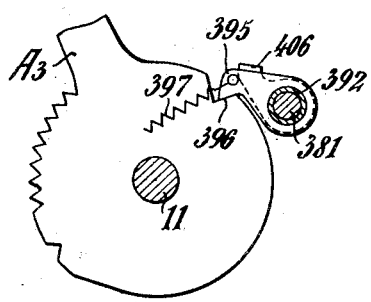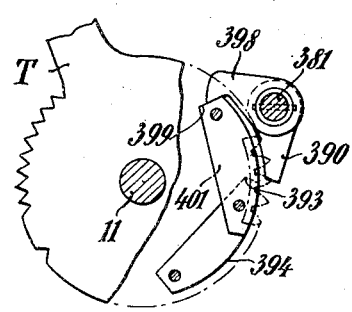

Patented Feb. 22, 1938

2,108,896

UNITED STATES PATENT OFFICE 2,108,896

CASH REGISTER

Karl August Lehmann, Freudenstadt, and Ernst Breitling, Berlin-Tempelhof, Germany, assignors to The National Cash Register Company, Dayton, Ohio, a corporation of Maryland Original application July 31, 1928, Serial No. 296,445. Divided and this application July 17, 1936, Serial No. 91,134. In Germany August 12, 1927

19 Claims. (Cl. 235—130)

The invention relates to cash registers having a plurality of special totalizers to separately record totals of items such as different kinds of taxes, and to also record a total of the transactions entered by the different clerks operating the machine and is a division of the application for U. S. Letters Patent, Serial No. 296,445 filed July 31, 1928, by Karl A. Lehmann and Ernst Breitling, now Patent No. 2,057,438.

It further relates to that type of machine in which the grand total of all these totalizers, or of certain groups thereof, is accumulated and taken. In cash registers of this type now in use a grand totalizer is provided which accumulates the total of the amounts on the various special totalizers, by being engaged during the operation in which the items are entered on the various totalizers. In this manner a grand total of the separate totals on the special totalizers is accumulated during the course of business.

With the invention, however, the amounts accumulated in the special totalizers are accumulated into a grand total by a series of successive total transferring operations at the end of a business day.

The use of this method has the advantage of requiring only one main or "grand" totalizer to accumulate a grand total of the amounts in all the special totalizers, or of the amounts in any particular group or sub-group thereof, whereas in many of the machines now in use a separate main totalizer must be employed for each group or sub-group of special totalizers. The patent to Shipley, No. 1,626,880, is illustrative of an arrangement wherein two main totalizers are provided for two groups of special totalizers.

This method has the additional advantage of not requiring the use of the main totalizer during the course of business, so that this totalizer is free to be used for separate accumulation during this period.

The use of this method furthermore does not duplicate the work of the operator, as it might at first seem, since the same number of operations used to transfer the totals from the special totalizers is necessary, in the normal use of machines of this type, to clear the totals from these totalizers and to record the amounts that were standing thereon.

To realize the chief idea of the invention a series of auxiliary mechanisms are required which substantially consist in mutual blocking and detent mechanisms for the setting means of the totalizers.

In order that the invention may be more easily understood, an embodiment of the same is illustrated by way of example in the drawings that accompany and form part of this specification. In these drawings:

Figure 9 is a section on line IX—IX of Figure 8,

Figure 11:
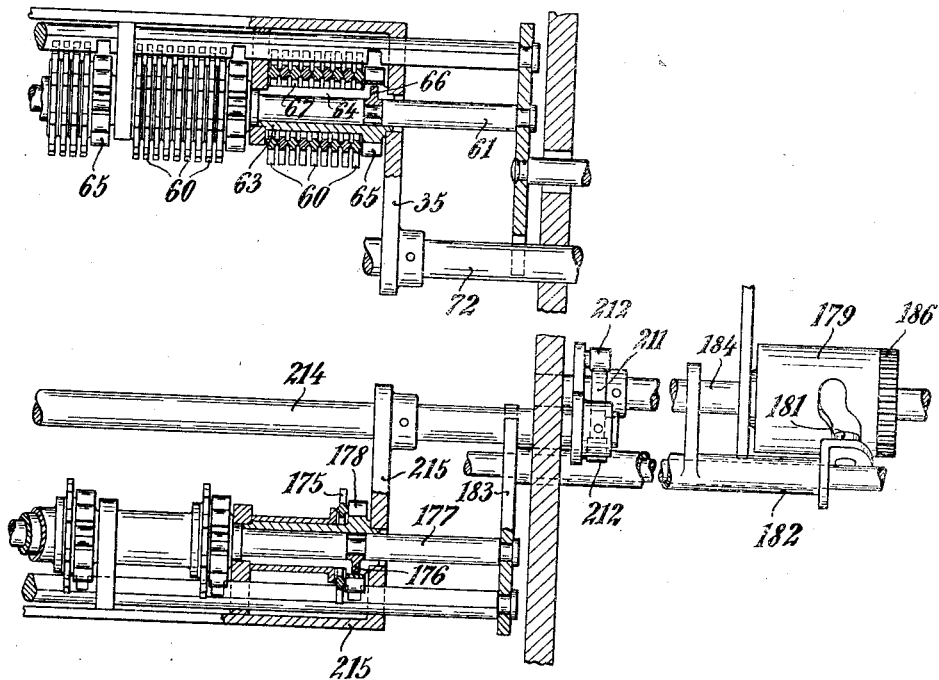

Figure 10 is a side view of the totalizer selecting key setting mechanism with the appurtenant differentially actuating mechanism, Figure 11 is a front view, partly in section, of a totalizer packet and of the main totalizer, Figure 12 is a longitudinal section through the setting mechanism for the totalizer controlling mechanism, Figure 13 is a side view of the mode of operation lever for the individual totalizers, Figure 13a is a perspective view of the actuating and locking discs shown in Figure 13, Figure 13b is a perspective view of the actuating and locking discs shown in Figure 12 which control the engagement of the main totalizer with the driving mechanism.

Figure 13D:
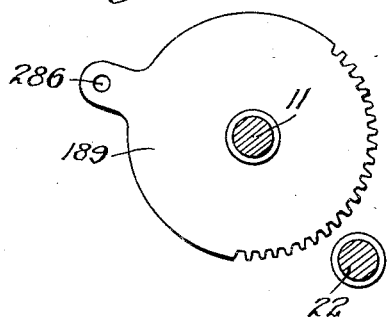

Figure 13c is a side view of the controlling discs for the main totalizer,

Figure 13d is a side view of a detail shown in Figure 21,

Figures 14 to 30 are details of the blocking mechanisms.

General description

The cash register hereinafter described is intended to be preferably used in tax offices and the like. The problems to be realized in offices of this character in particular consist in separately accumulating each amount introduced in two totalizers according to the kind of the tax and to the mode of payment and to take both the totals and sub-totals from the totalizers allotted to the individual kinds of taxes and modes of payment, and the grand total of the totalizers that accumulate these kinds of taxes and modes of payment. Besides, it must be possible to take the total of a series of entries involved in a single transaction made during the business day in contradistinction to the totals taken at the end of the day.

Figure 1:
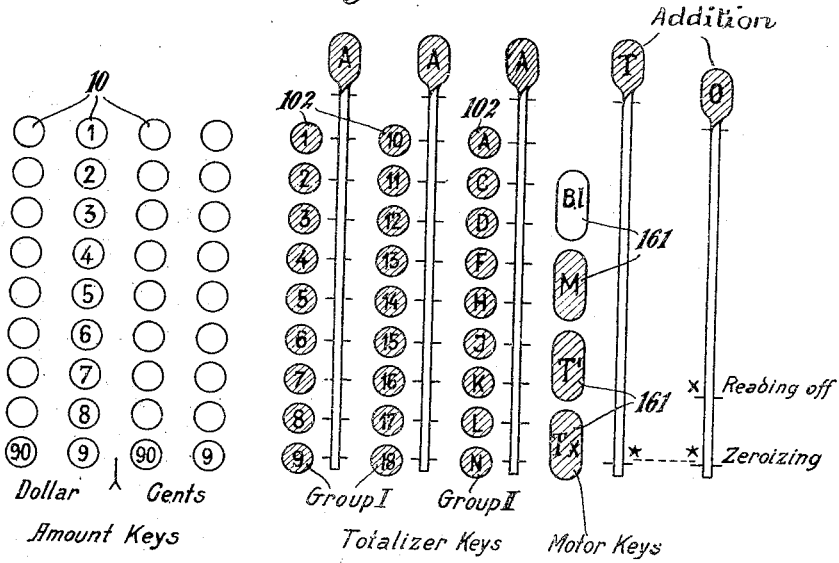
Figures 1 to 7 are diagrammatic illustrations of the setting mechanism, with different adjustments thereof.
Figure 2:
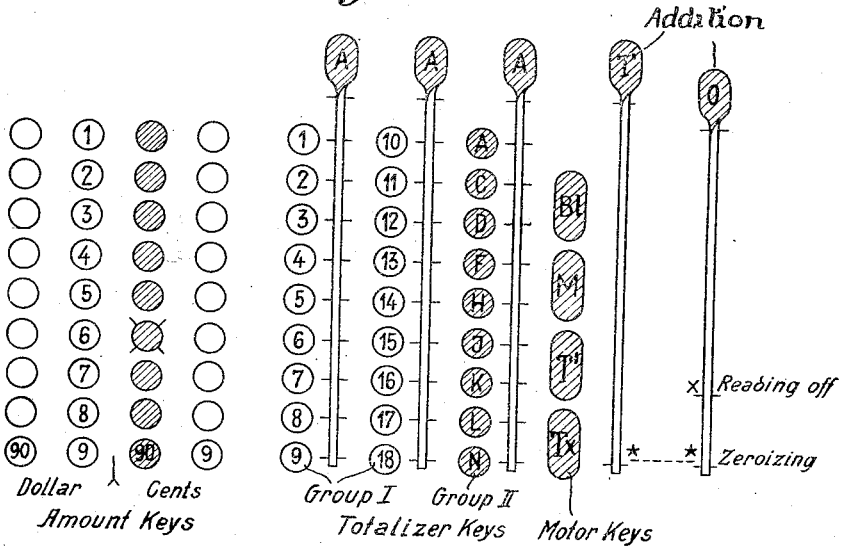

The setting mechanism of the machine comprises four rows of amount keys 10, Figure 1, three rows of totalizer keys 102, one row of motor keys 161 and two mode of operation levers denoted T and O, which determine whether such operations as the taking of a sub-total or total from a special totalizer or the grand total from the main totalizer are to be performed as well as the simple entering of amounts in these totalizers. Besides each row of totalizer keys 102 a selecting lever A is arranged which serves to select the totalizers in taking totals, instead of the keys 102.

In using the present cash register in a tax office, the amount keys 10 serve to adjust the amount of the tax which is introduced by them into two totalizers. One of these totalizers is allotted to the kinds of taxes and is selected by the totalizer keys 1 to 18, while the other of these totalizers belong to the mode of payment (cash, post money order, bank order or the like). The selection of this totalizer is made by means of the totalizer keys A to N.

The motor keys 161 effect the release of the machine operation and control at the same time the engagement of the selected totalizers and the main totalizer. In particular, key M causes the engagement of the selected totalizers, key T' that of the selected totalizers and of the main totalizer, and key Tx the engagement of the main totalizer alone. The Bl key is depressed to release the machine for an idle operation preceding a total taking operation.

The mode of operation lever O determines the operations Addition, Reading Off (sub-total) or Zeroizing (end total) of the engaged special totalizers, while lever T determines the operations Addition or Zeroizing (end total) of the main totalizer. When e. g. the levers O and T are set to Adding and key M is depressed, the amount introduced by the amount keys 10 is transmitted to only the two special totalizers that have been selected by the keys 102. However, upon depressing key T' instead of M, the transmission takes place also to the main totalizer. Upon depressing the Tx key, instead of either the keys T' or M, the amount is entered only into the main totalizer. When the lever T is set to Zeroizing, then, upon depressing key Tx, the total is taken from the main totalizer. The machine operates in this manner because the depression of keys T' or Tx engages the main totalizer for operation, whereas the depression of key M does not. When the sub-total is to be taken from a totalizer selected by the respective lever A, the lever O is set to "Reading Off" and key M is depressed. In order to form, at the end of the business time, the total of the amounts of the totalizers of each totalizer group, lever O is set to Zeroizing, lever T to Addition and key T' is depressed. These manipulations result in the total being taken from the totalizer that has been selected by means of a totalizer lever A, and, further, the additive transmission of the total taken to the main totalizer. The taking of the total from the main totalizer then takes place, as mentioned above, by setting lever T to Zeroizing and depressing the key Tx. The total taking operations are prepared by an idle operation that is released by the blank key Bl. These total taking operations at the end of the business day provide a check for entries made in the special totalizers of the two groups during the day. The main totalizer does not take up the totals of these groups of special totalizers until the end of the business day. It is in a zeroized condition before the total taking operations are initiated. This main totalizer is available for the totalizing of composite entries during the course of the business day.

It may be noted that only the above-indicated setting possibilities come into consideration in using the machine as a tax office cash register, and that other possibilities substantially are excluded by blocking mechanisms provided between the setting means.

Classification totalizers

Three totalizer packets I, II, III, see Figure 10, correspond to the three rows 102 of totalizer keys, each packet comprising nine individual totalizers, the totalizer packets I and II allotted to the totalizer keys 1 to 18 serving to regiser the kinds of taxes, while the packet III is allotted to the keys A to N serving to register the modes of payment.

Figure 8:
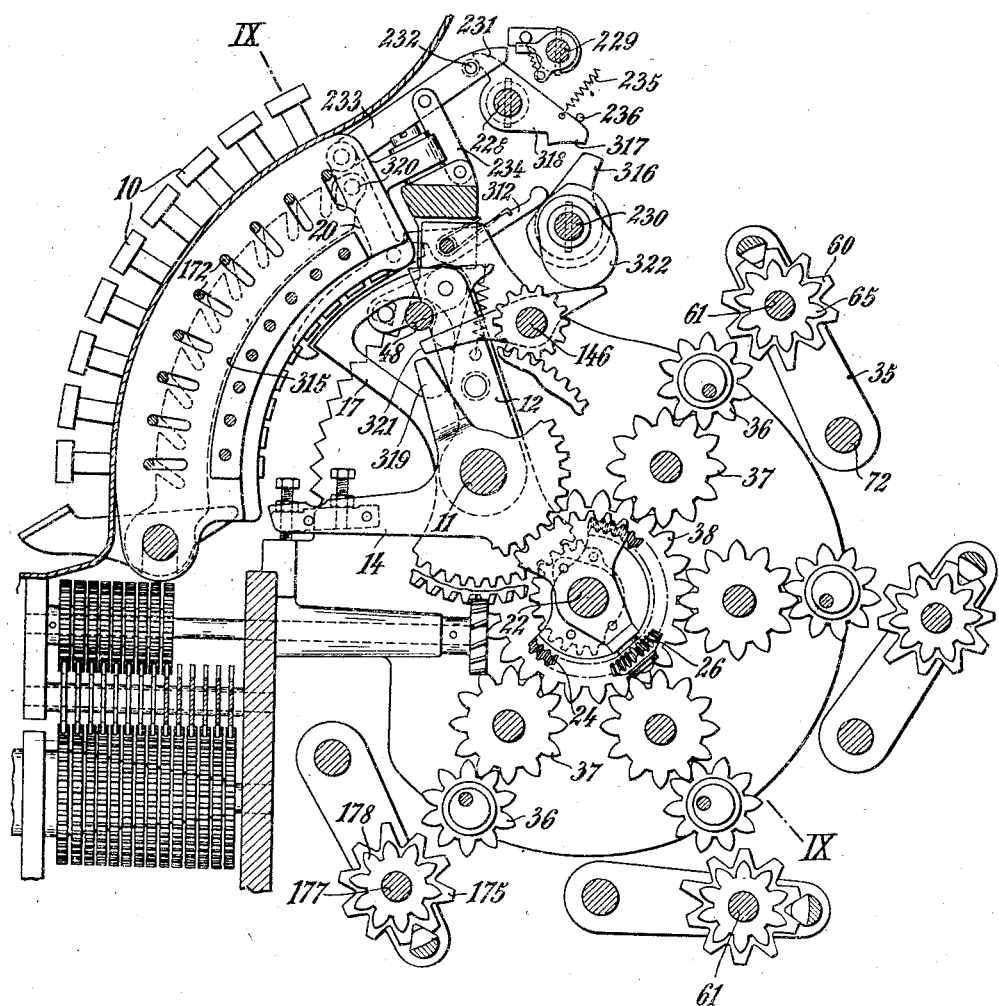
Figure 8 is a side view of the amount setting mechanism with the appurtenant differentially actuating mechanism and totalizers.

In each of these packets the counting wheels 60, Figure 11, of the nine totalizers are arranged side by side on a shaft 61, the wheels 60 of the units, tens, etc. order being united and mounted on the hub 63 of a differential wheel 65, Figures 11 and 10, which may be brought into mesh with an intermediate wheel 36, Figures 8 and 10, by rocking the respective totalizer packet. The intermediate wheel 36 is in connection through another intermediate wheel 37 with a differential wheel 38 common to all differential wheels 65 of the respective order. The differential wheels 65 may be connected to the counting wheels 60 of one of the nine totalizers of the packet by riders 66, Figure 11, rotatably but not shiftably mounted on shaft 61 and co-operating with inside teeth 67 of the counting wheels 60 and with a longitudinal groove 64 of hub 63, the riders 66 being set to the respective counting wheels 60 by the shaft 61 being shifted.

This shifting motion of shaft 61 is caused by a step-notched drum 119, Figure 12, the step notch 121 of which is engaged by a roller 124 mounted on a sleeve 123. The latter is connected to a plate 126 that so engages an annular groove of the rider shaft 61, that the latter is forced to take part in the sideways shift of the plate 126, without being impeded from partaking of the rocking motion about the bearing shaft 72, Figures 11 and 12, to set the totalizer packet into operative position.

The rotation of the drum 119 required to select a totalizer is effected, in introducing an amount, by the operation of the machine, after one of the keys 102, Figure 1, of the respective row has previously been depressed; in taking a total, however, it is effected directly by hand by setting the appurtenant lever A.

Totalizer selecting mechanism

The totalizer keys 102 are arranged, like the amount keys 10 and the motor keys 161, in known manner concentrically with a shaft 11, Figure 10, on which are mounted the differential member 103 and the companion differential member 104. The members 103, 104 are so interconnected by a bevel wheel differential gear 107, 108, 109, Figures 10 and 12, mounted on a shaft 22, that they are moved in known manner from both sides to the foot of the depressed key 102, Figure 10, by rotation of shaft 22 on which the bevel wheel 109 of said gear is rigidly fixed, and are returned by shaft 22 rotating reversely. In so doing, the members 103, 104 take between them the pin 112, Figures 10 and 12, of a setting member 110, loose on shaft 11, for the indicating and type wheel and set this member likewise according to the depressed key 102. The setting member 110 is rigidly connected to a segment 113, Figures 10, 12, by a hub 114, Figure 12. The segment 113 is in mesh by a series of upper teeth 148, Figure 10, with a pinion 147 mounted on a shaft 146, and by a lower series of teeth with a pinion 115, Figures 10, 12, mounted on the shaft 22. The pinion 115 is connected through a hub 116, Figure 12, to a toothed segment 117 that engages a pinion 118 carried by the step-notched drum of the totalizer packet in consideration. Owing to this arrangement upon the rotation of shaft 22 taking place during the operation of the machine, also the drum 119 is set according to the key depressed in the appurtenant row of keys 102, whereby the rider shaft 61 is shifted sideways and the totalizer corresponding to the depressed key 102 is coupled with the differential wheels 65, Figure 11.

Interlocking mechanism

A key locking mechanism is provided in each row of the totalizer keys 102, Figures 10 and 12, which is formed by rocking levers 163 pivoted on pins 162. A zero stop pawl 167, 168 is pivotally mounted on pin 166 near the uppermost rocking lever 163, Figure 10, the upwardly directed arm 167 of which pawl under the action of a spring 164 abuts on the uppermost rocking lever 163, whilst the lower hook-shaped arm 168 of the pawl engages a segment 171 rigidly connected to the differential member 103 and holds the latter in position of rest as long as no key 102 is depressed. Upon depressing a key 102, a lateral pin 172 fast thereon penetrates between the adjacent rocking levers 163, whereby the zero stop pawl 168 executes a rocking motion in clockwise direction about pin 166 and thereby releases the differential member 103. The rocking amplitude of the pawl 168 is so limited, that only one single pin 172 is able to penetrate between the rocking levers 163, so that a simultaneous depression of more than one key of the row is rendered impossible. Similar mechanisms are provided with the rows of amount keys 10 and with the row of motor keys 161. This latter row however possesses only a lever 173, Figure 19, instead of a zero stop pawl, and the key denoted by Bl does not co-operate with the key excluding mechanism. Besides the described key excluding mechanism releasable locking means (not shown) are provide in each row of keys, which means lock the keys in depressed position until they are released at the end of the machine operation.

Idle preparatory operation

The levers A, Figure 10, loosely mounted on shaft 11, are held in the position to which they are moved by a resilient pawl 143 engaging a series of notches 149 provided on the narrow front faces of the levers A. On the rear, the levers A carry a series of teeth 145 co-operating with the pinion 147. In the position of rest of the lever A, Figure 10, the teeth 145 are out of gear with the pinion 147. As soon, however, as the lever A is moved from position of rest, the teeth 145 engage pinion 147 and position it and therewith the step-notched drum 119 positively connected thereto according to that key 102 beside which the lever A has been set. As the setting members 110, which as described are secured to segments 113 permanently in mesh with the pinions 147 by the teeth 148, remain between operations, in their positions imparted to them in the preceding operation, special means must be provided to permit the teeth 145 of lever A to engage the pinion 147 only if the setting members 110 and segments 113 are in their uppermost or home position. This object is obtained by an idle operation of the machine being executed before the first depression of a lever A, in which operation all setting members 110 are moved to their home position above mentioned. Special interlocking means for enforcing this idle operation previous to a setting of totalizer levers A is described hereinafter. Levers A are blocked against movement until an idle operation renders free the mode of operation levers T and O, the setting of which releases the levers A. Thus assurance is had that the control exercised by the levers A upon the setting members is initiated when those members are in their home position.

Amount differential mechanism

The amounts introduced by the keys 10, Figures 1, 8, 9, are transmitted to the differentially actuating wheels 38, Figure 8, by the amount differential mechanism. This mechanism is designed in a manner similar to that of the described totalizer key differential mechanism. It consists of the differential member 12 mounted on the shaft 11 and of the companion differential member 14, said two members being so connected with one another by means of a differential gear 24, 26, 25 arranged on shaft 22, that upon shaft 22 rotating, they are moved from both sides like tong jaws toward the foot of the depressed key 10, whereby they take with them the pin 48 into a position corresponding to the depressed key, the setting member 47, Figure 9, actuating the respective indicating and type wheel. The differential wheels 38, common to all totalizer packets, are in rigid connection with the bevel wheels 24 of the differential gear, which wheels are positively connected with the differential members 12 by the segment 17, so that the differential wheels 38 are rotated corresponding to the depressed amount keys 10 in each differential operation.

Classification totalizer engaging mechanism

The engagement of the differential wheels 64, Figure 8, with the intermediate wheels 36 is established by rocking the shaft 72 on which the totalizer frames 35 are rigidly fixed. To this end an arm 75, Figures 10, 12 rigid on shaft 72 embraces by two rollers 76 an eccentric 77 fast on a shaft 74. The three shafts 74 of the three totalizer packets I, II, III are in mesh through wheels 78, Figure 12 with a common wheel 79, which is fixed on a sleeve 81 shiftably mounted on shaft 22 and carries a crown of actuating teeth 82 and a crown of locking teeth 83. The actuating teeth 82 are adapted to co-operate with three actuating members, 87, 88, 89, Figure 13, each carrying two pairs of actuating teeth 101, Figure 13. The locking teeth 83 co-operate with correspondingly designed locking discs 84, 85, 86 in the manner of a Maltese cross locking device. The locking members and actuating discs 84 to 89 are rigid on shaft 11. The sleeve 81 may be shifted by the mode of operation lever O, Figures 13, 12, mounted on shaft 11, in such a manner, that the teeth 82 will lie in the plane of any one of the three actuating members 87 to 89 while at the same time the teeth 83 will lie in the plane of the corresponding locking member 84 to 86. This shift of sleeve 81 is obtained by a step-notched segment 97, Figure 12, rigidly connected to lever O, Figure 13, the step notch 96 of which segment is engaged by a roller 95, the pivot of which is rotatably but not shiftably connected to sleeve 81. During the operation of the machine, where one full revolution is imparted to shaft 11, a full revolution, composed of two sections of 180 degrees each, is imparted to shaft 74, Figure 12, by the actuating and locking members 84 to 89, which revolution acts in such a manner on the totalizer packets I, II, III, Figure 10, through the eccentrics 77, that by the first section of this rotation the packets are rocked into gear and by the other section they are rocked out. These sectional rotations take place at different times, according to which pair of the actuating and locking members 84 to 89, Figure 12, is in mesh with the teeth 82, 83.

In the position of rest, corresponding to Addition, of the mode of operation lever O, Figures 12, 13, the throwing into and out of gear of the totalizer packets is determined by the members 84, 87 belonging to the adding operation; in the position Reading off of lever O, by the members 85, 88 belonging to the operation of taking a sub-total; and in the position Zeroizing, by the members 86, 89 belonging to the operation of taking the grand total. Consequently, in the first case (addition) the packets are thrown-in before the beginning of the return motion of the amount differential members 38, Figure 10, and are thrown-out at the end of this motion; in the second case (reading off) the packets are thrown-in before the beginning of the forward motion of the differential wheels 38 and thrown-out after their return motion has been terminated; whilst in the third case (zeroizing) they are thrown-in before the beginning of the forward motion of wheels 38 and thrown-out after this forward motion has been terminated. In adding operations the amount set by the amount keys 19 is transmitted to the totalizers that have been selected by means of the amount keys 102. In reading off, the total contained in the totalizers thrown-in by means of the levers A is transmitted to the indicating and printing mechanism, the counting wheels being returned to the position they assumed before reading off. In zeroizing, however, the counting wheels remain in zero position after the total has been transmitted to the indicating and printing mechanism.

Main totalizer

The main totalizer is lodged in the portion denoted by IV, Figure 10, of the machine. Its construction is similar to that of the totalizer packets I to III. Instead of nine counting wheels, however, only one counting wheel 175, Figure 11, is provided in each order; which wheel may be coupled with the differential wheel 178, that co-operates with the appurtenant intermediate wheel 36, by means of a rider 176 by the rider shaft 177 being shifted. This shifting motion of shaft 177 to throw the main totalizer into and out of gear is obtained by means of a special step-notched drum 179, Figure 12, which is connected with the shaft 177 in a manner similar to the connection of drum 119 with the rider shaft 61, viz. by a roller 181, Figure 10, a shiftable sleeve 182, and a plate 183. The drum 179, Figure 12, is mounted on a shaft 184 and is in permanent connection with a disc 189 through a crown of teeth 186, Figure 12, a segment 187 mounted on shaft 22 and a pinion 188 connected to the segment which disc 189 is rigidly connected by a hub 191 with the setting member 192 of the motor key board 161.

Motor key differential

The differential mechanism of the motor key board is designed like the amount differential mechanism. The two differentially actuating members 193 and 194, Figure 12, interconnected through a differential gear 195, 196, 197, are moved from both sides toward the foot of the depressed motor key 161 by the rotation of shaft 22 and thereby adjust the setting member 192 together with the indicating and type wheel connected thereto corresponding to the depressed motor key. The step notch 198 of the drum 179 is cut in such a manner, that the main totalizer is thrown out of gear upon the setting member 192 being set to the keys Bl and M, Figure 1, and is thrown into gear upon these members being set to the keys T' and Tx.

Main totalizer engaging controls

The selection of the mode of operation of the main totalizer is performed by special locking and actuating discs 201 to 204 mounted on shaft 11 and co-operating in the manner of a Maltese cross locking device with crowns of locking and actuating teeth 205, 206 of a shifting sleeve 208 that is connected with a toothed wheel 207. The latter is in mesh with a wheel 209 fast on shaft 184. This shaft carries on its other end an eccentric 211, Figure 10, co-operating with two rollers 213 of the rocking shaft 214 of the totalizer frame 215 of the main totalizer. The sleeve 208, Figure 12, is in connection through a roller 216, with a step-notched segment 217, on which the mode of operation lever T for the main totalizer is rigidly fixed. This mode of operation controlling mechanism acts in a manner similar to that allotted to the special totalizers. In the home position of the lever T the toothed crowns 205, 206 co-operate with the mode of operation discs 201, 203 intended for adding operations, so that the amount set in the amount differential wheels 38 by the keys 19 or by taking the total from one of the individual totalizers is transferred additively to the main totalizer, provided the proper key in the motor key bank was depressed to cause the main totalizer to be engaged for this operation. In the position Zeroizing of the lever T the teeth 205, 206 co-operate with the discs 202, 204 intended for taking the grand total, the total contained in the main totalizer being transferred to the indicating and printing mechanism and the main totalizer being zeroized. A mode of operation Reading off is not provided for the main totalizer.

Machine release

The release and start of the operation of the machine is caused by depressing one of the motor keys 161. The above-mentioned lever 173, Figure 19, of the key excluding mechanism of the motor key board, is pivoted by a pin 218 to a slide 221, the lower end of which is guided on a cross bar 219. This slide 221 is connected to the releasing lever 224 by a pin and slot connection 222, 223. Upon depressing one of the motor keys M, T' and Tx, the slide 221 is shifted upward due to the appurtenant key pin 172 penetrating between the respective two neighboring rocking levers 163, whereby the releasing lever 224 is moved into releasing position, this causing the start of the machine operation.

A special slide 225, Figure 20, is provided for the idle operation key denoted by Bl, as this key does not co-operate with the key excluding mechanism 163 of the motor key board. This slide 225 is guided on its top on a fixed cross bar 226 and has at its lower end a slot (not shown) in which engages the pin 223, Figure 19, of the releasing lever 224 in the same manner as the slide 221. The slide 225 has a slope face 227 located in the range of the pin 172 of the idle key, by which face slide 225 is moved when the key is depressed.

The blocking mechanisms

In order to execute with security the above-indicated calculating operations, the machine is equipped with blocking mechanisms between the setting means in such a manner, that the operator is forced in every state of the machine either to continue the operation just commenced or in certain cases to select one of the operations that can be continued.

Interlock between amount keys and idle operation key Bl

In the rear of the upper portion of the setting mechanism, are rotatably mounted in the machine frame three shafts, viz. a blocking shaft 228, Figure 8, a locking shaft 229, and a shaft 230. The blocking shaft 228 has rigidly mounted on it in the range of each row of amount keys a lug 231, Figures 8, 14, which co-operates with a pin 232 or the like of a slide 233. The latter is hinged on its front end to the zero stop pawl 20, Figures 8, 15, of the respective row of amount keys and is guided by a link 234 pivoted on the machine frame. Upon an amount key 10 being depressed, the zero pawl is rocked as described above, and the slide 233 is moved backward. This causes the shaft 228 to turn in clockwise direction out of position of rest, in which it abuts on a stop 236, Figure 8, under the action of a spring 235. In the range of the motor key board the shaft 228 carries a locking lug 237, Figure 20, that co-operates with a nose 238 of the slide 225 influenced by the idle operation key Bl. When shaft 228 turns, lug 237 arrives before the nose 238 and locks key Bl against being depressed. Inversely, the amount keys are locked, when by depressing key Bl the nose 238 has been shifted into the path of lug 237 and thus prevents rotation of shaft 228.

Release of special key upon depression of amount keys

Furthermore, the shaft 228 carries, in the range of the two rows of totalizer keys 1 to 9 and 10 to 18, the lugs 239, 239' respectively, Figures 10, 16, 17, which in the position of rest of shaft 228 are opposite a stop 241 of a slide 242, Figures 10, 16, of the row of totalizer keys 1 to 9, and opposite a stop 241' of a slide 243, Figure 17, of the row of totalizer keys 10 to 18.

The slide 242, Figures 10, 16, is hinged to the zero stop pawl 168. Slide 243, Figure 17, is hinged to the upper lever 244 of the key excluding mechanism of the totalizer key row 10 to 18, to the latter of which the appurtenant zero stop pawl 245 is yieldingly connected by a spring 246. As long as no amount key 10 is depressed, the totalizer keys 1 to 18 are locked by the lugs 239 and 239'. Upon an amount key being depressed, these lugs are rocked upwards and release the stops 241, 241' and therewith the totalizer keys 1 to 18.

Interlock between rows of special keys 1 to 18

In order to permit only one of the totalizer keys 1 to 18 to be depressed, a locking arrangement is provided between rows 1 to 9 and 10 to 18. This arrangement consists of a sleeve 247, Figures 16, 17, mounted on shaft 228 and having a lug 248, Figure 16, which co-operates with a pin 249 of the slide 242 of the totalizer keys 1 to 9. On the right, the sleeve has a nose 251, Figure 17, co-operating with the stop 241' of slide 243 of the row of totalizer keys 10 to 18. Upon one of the totalizer keys 1 to 9 being depressed, the sleeve 247 is rotated in clockwise direction by the pin 249, Figure 16, and lug 248 against the action of a spring 252, so that the nose 251 arrives in the path of stop 241' and locks the keys 10 to 18. Upon one of the totalizer keys 10 to 18 being depressed, the keys 1 to 9 are locked by the sleeve 247 being locked by stop 241', Figure 17, that has arrived above the nose 251.

Release of special keys A to N

The totalizer keys A to N are normally locked by a nose 253, Figure 18, which is opposite a lug 254 of a slide 256 hinged to the zero stop pawl 255 of the key board A to N. The nose 253 is carried by a yoke 257, Figure 14, which is rockably mounted on shaft 228 and held in the position shown in Figure 18 by a spring 258. The yoke 257 carries two set screws 259 and 261, Figure 14, the screw 259 abutting on lug 248, Figure 16, of sleeve 247, while screw 261 abuts on an extension 262, Figure 17, of slide 243. Upon one of the totalizer keys 1 to 18 being depressed, the yoke 257 is swung against the action of spring 258, Figure 18, and the nose 253 is moved out of the path of the lug 254, so that one of the totalizer keys A to N is able to be depressed.

Release of motor keys by keys A to N

The slide 256, Figure 18, of the keys A to N co-operates with an arm 265 rigid on sleeve 264 by means of a pin 263. The sleeve 264 carries on its other end a nose 266, Figures 14, 19, which normally is opposite a stop 267 of a slide 268 hinged to the upper lever 173 of the excluding mechanism of the motor keys M, T', Tx, and locks these motor keys. Upon one of the keys A to N being depressed, sleeve 264, Figure 18, is rocked in clockwise direction against the action of a spring 269, the nose 266, Figure 19, thereby releasing the motor keys M, T' and Tx for depression.

As can be seen from the foregoing, firstly only the amount key 10 and the motor key Bl are free, while all other keys are in locked state, and one of the motor keys M, T', Tx can only be depressed after the successive depression of an amount key, of one of the totalizer keys 1 to 18 and of one of the totalizer keys A to N. When an amount key is depressed, the other keys of the respective row are locked by the key excluding mechanism 163, 172. The non-depressed totalizer keys are locked partly by the appurtenant excluding mechanism 163, 172 and partly by the mutual blocking members 248, 251, Figures 16, 17.

Amount key locked by depression of motor keys

In order to lock also the amount keys of the rows in which no keys have been depressed, the locking shaft 229, Figure 19, carries a lug 271 which through an intermediate lever 272 co-operates with a pin 273 of the slide 268. In the range of the rows of the amount keys the locking shaft 229 has rigid on it lugs 274, Figures 14, 15, on which abut, under the action of springs 275, locking arms 276 loose on shaft 229 and co-operating with extensions 277 of the slides 233. By depressing one of the motor keys M, T', Tx, the locking shaft 229 is rocked in counter-clockwise direction by the intermediate lever 272, Figure 19, so that the locking arms 276, Figure 15, arrive behind the extensions 277 and thus lock the amount key rows. In those rows, where an amount key has been depressed and consequently the extension 277 arrived below the locking arm 276, the latter is retained, when shaft 229 is rocked the spring 275 being tensioned. After a motor key has been depressed, all amount keys are thus locked and of course also all other keys.

*Idle preparatory operation—release of mode of operation levers*

By depression of the motor key B*l* an idle operation of the machine is started, that serves to prepare the subsequent total-taking operation. In particular, the setting members 47, 110, 192, Figures 9, 12, respectively, that appear to have been displaced from position of rest, are thereby returned and the two mode of operation levers T and O, Figure 1, released.

The two mode of operation levers T and O carry pins 278, Figures 12, 21, and 279, Figures 12, 22 over which engage, under the action of a spring 284, two pawls 282, 283 rigidly interconnected by a sleeve 281 mounted on shaft 146. A slope face 285 of pawl 282, Figure 21, is in the path of a pin 286, Figures 12, 21, which is mounted on the disc 189 that is rigidly fixed on the setting member 192. Upon the setting member 192 being moved, in the idle operation, to its position under the motor key B*l*, the group of pawls 282, 283 is lifted by the pin 286, Figure 21, engaging the slope face 285. The levers T and O are now free to be lowered. When the machine is now operated by depression of one of the motor keys M, T', or T*x*, the setting member 192 is moved to another position, allowing the pawls to fall back into their original locking position.

*Transfer total operation—release of mode of operation lever T*

At the end of the business time the totals from the special totalizers are transmitted to the main totalizer, this being done with the lever O in zeroizing position. In order to avoid thereafter a new idle operation in order to release the lever T from pawl 282 to enable the total to be taken from the main totalizer, a pin 287, Figure 22, is provided on the lever O, which pin co-operates with a downwardly directed extension 288 of pawl 283. As long as lever O is in the zeroizing position, the group of pawls 282, 283 is lifted by pin 287 and extension 288, irrespective of the position in which the setting member 192 of the motor key board happens to be, and lever T can be set in order to take the total from the main totalizer without a special idle operation being needed to release lever T from pawl 282.

*Zero stop throwout means for total taking operations*

Each of the two mode of operation levers T and O acts upon the shaft 230. To this end lever T, Figure 21, carries a series of teeth 289 and a locking face 291 adapted to co-operate in the manner of the well known Maltese cross locking mechanism with an actuating pinion 292 and rotates the latter 180 degrees, when lever T has been set to Zeroizing. The rotation of pinion 292 is transmitted, through a toothed segment 293 rigid thereon, to a pinion 294 mounted on the shaft 230 and rigidly connected by a sleeve 295, Figure 12, to a bevel wheel 296. In a similar manner the mode of operation lever O, Figure 22, is equipped with a series of teeth 297 and a locking face 298, that co-operate with a pinion 299. The latter is positively connected to a bevel wheel 304 through pinions 301, 302 and a sleeve 303, Figure 12. The two bevel wheels 296, 304 engage an intermediate wheel 305, Figure 12, the journal 300 of which is rigidly connected to the shaft 230. As can be seen from the foregoing, the shaft 230 is in permanent positive connection with the two mode of operation levers T, O and may be rotated separately by each of them.

The shaft 230 extends along the whole setting mechanism of the machine and has in the range of each row of amount keys 10 a cam 306, Figure 15, in the range of the totalizer key row 1 to 9 a cam 307, Figure 16, in the range of the totalizer key row 10 to 18 a cam 308, Figure 17, and in the range of the totalizer key row A to N a cam 309, Figure 18. These cams 306 to 309 co-operate with spring-influenced sub-levers 312 mounted on journals 311, Figures 15 to 18, and adapted to act by their front arms on an extension 313 of the zero stop pawls 20, 168, 245 and 255, and to lift these pawls into releasing position, as soon as the rotation of shaft 230 causes the rise of the cams 314 to engage the sub-levers 312. When the pawls are lifted, they release the appurtenant differential members 12, Figure 8, and 103, Figure 10, so that in the subsequent total taking operation the amount differential members 12, Figure 8, and the differential members 103, Figure 10, of the totalizer key rows are free to be set respectively, according to the amount contained in the selected totalizer, and to the positions of the levers A.

By the rocking of the zero stop pawls, the blocked state prevailing between the key rows is removed, as this rocking has the same effect as if a key had been depressed in each of the key rows. The blocking members must be successively displaced as in the adjustment by the keys, beginning with the amount key rows, for which reason the slope faces 314, see particularly Figure 18, are staggeredly arranged on shaft 230 and act thus one after the other. As the two totalizer key rows 1 to 9 and 10 to 18 are blocked relatively to one another by the sleeve 247, Figures 14, 16, 17, and the lugs 246, 251, the slide 243, Figure 17, is locked, when the zero stop pawl 168, Figure 16, is rocked. For this reason, as described, the zero stop pawl 245, Figure 17, is not connected with the slide 243 by a member integral with the pawl, but by a yielding force, so that this pawl can be rocked even if slide 243 is being locked.

*Interlock between keys and mode of operation levers*

In order to lock all amount and totalizer keys as soon as one of the levers T and O is moved out of its position of rest, locking segments 315, Figures 8, 10, are arranged which are hinged by pivots 320 on the zero stop pawls 20, Figure 15, 168, Figure 16, and 255, Figure 18. The upper narrow surfaces of these locking segments 315 enter into the path of the key pins 172 and thus lock the keys against being depressed, as soon as the appurtenant zero stop pawl is rocked.

A lug 316 is further rigid on the shaft 230, Figure 8, which lug so co-operates with a locking face 317 of a lever 318 rigid on the blocking shaft 228, that by depression of an amount key 10 the shaft 230 and therewith lever T or O is locked. As long as lug 316 is below the locking face 317 upon lever T or O being moved, the amount keys 10 are secured against being depressed, by the shaft 228 being locked.

*Differential control during total taking operations*

In totalizing, the companion differential members 14, Figure 8, must be locked in position of rest until the appurtenant counting wheel has been zeroized. To this end each companion differential member 14 possesses an extension 319 co-operating with a lever 321, Figures 8, 15, mounted on the shaft 146 and abutting under the action of a spring on a lifting cam 322 of the shaft 230. Lever 321 is normally held by this cam out of the path of the extension 319. The mechanism for controlling the movements of the lever 321 during total taking operations is not shown herein, but a similar mechanism is shown and described in the United States Patent No. 1,899,455, issued to Ernst Breitling. By this mechanism, the lever 321 is moved out of locking position when its corresponding totalizer wheel reaches zero, to permit the member 14 to be adjusted according to the value on the totalizer wheel. As soon as one of the mode of operation levers T, O is moved out of position of rest, the cams 322 release the levers 321, so that the latter, under the action of their springs, can rock behind the extensions 319, to lock the companion differential members 14. When the lever T or O is restored to normal position, the cam 322 forces the lever 321 out of locking position to free the member 14 for adding operations.

*Totalizer selecting lever lock*

Figure 25:
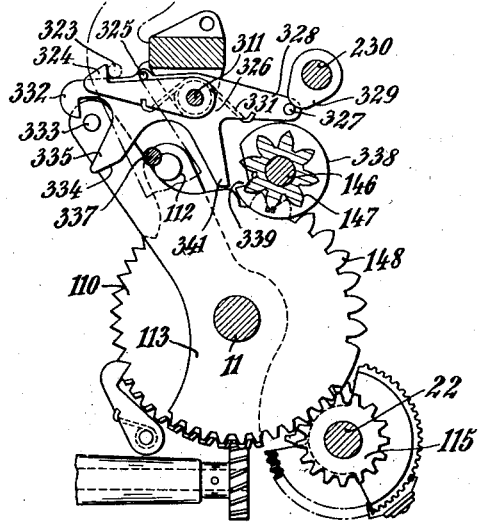

Each of the levers A, Figure 1, which are used instead of the keys 102 to select the totalizers for taking the total therefrom, is normally locked by a pin 323, Figure 25, fixed thereon and by a pawl 324 mounted on journal 311 and abutting under spring action on a stop 325 of a multi-armed lever 326 likewise pivoted on journal 311. The lever 326 co-operates by a pin 327 of its rear arm 328 with a cam 329 rigid on the shaft 230 and is held, in the position of rest of this shaft, by cam 329 in such a position against the action of a spring 331, that the pawl 324 locks lever A by means of pin 323 and that a forwardly directed hook 332 of lever 326 releases a pin 333. The latter is carried by segment 113 which, as described, is rigidly connected to the setting member 110 of the appurtenant totalizer key board. Therefore as long as the shaft 230 and the levers T and O are in position of rest, the levers A are locked in position of rest and the setting members 110 are free to be set corresponding to the depressed totalizer keys 102. Upon one of the levers T, O being moved out of position of rest, the cams 329 release the levers 326 and the latter rock under the action of their springs 331 in counter-clockwise direction, the pawls 324 releasing the levers A and the hooks 332 falling on the pins 333, so that the setting members 110 are locked in zero position. A pin 337 carried by lever A so co-operates with a rear sloped narrow face 334 of a downwardly directed arm 335 of lever 326, that the latter is swung back to position of rest as soon as the respective lever A is moved out of zero position. When this takes place, the appurtenant setting member 110 is again released from hook 332 and is thus enabled, after having been coupled in the described manner by pinion 147 with lever A, to move together with the latter into the position corresponding to the totalizer to be selected. Pinion 147 has rigidly conneced to it a locking disc 338, that has a recess 339 which in the zero position of the setting member 110 is opposite a downwardly directed arm 341 of lever 326. This locking arrangement serves to hold lever 326 in the position of Figure 25, after pin 337 in the setting motion of lever A has left stop 335 in order to prevent hook 332 from again catching pin 333 and thus hindering the motion of the setting member 110 during the operation of the machine.

*Means to lock setting levers in position during machine operation*

Spring-actuated pawls 342, Figures 21, 22, are provided for the levers T and O, which pawls co-operate with series of notches 343 of these levers and lock them in the set position. The pawls 342 and the pawls 143, Figure 10, for the levers A are mounted on the shaft 344 and possess downwardly directed arms 345 that co-operate with locking discs 346, Figure 21. These discs are mounted on a shaft 347 and have a recess 348 which in the position of rest is opposite the arm 345. At the beginning of the operation of the machine shaft 347 is turned. When this takes place, the full section of the circumference of the locking discs 346 arrives below the arms 345, whereby the levers A, T, O are locked in their set position.

*Means to couple main totalizer for zeroizing operations*

The adjustment of the main totalizer to the operation of taking the total takes place, as described, by setting the lever T to Zeroizing. In order to couple in this adjustment at the same time the counting wheels 175, Figure 11, of the main totalizer previous to the beginning of the machine operation with the appurtenant differential wheels 176, a pin or bolt 349, Figure 21, is provided on the lever T, which pin projects into a slot 351, Figures 12, 21, of the disc 189 connected to the setting member 192 of the motor key board, Figures 12, 21. The slot 351 does not impede the setting member 192 from being positioned according to the depressed motor keys, provided lever T is in position of rest. If, however, the latter is set to position Zeroizing, the pin 349 engages the upper wall of slot 351 and takes with it the setting member 192 into a position, in which the appurtenant step-notched drum 179, Figure 12, is set to Throwing-in and the rider shaft 177, Figure 11, of the main totalizer is shifted into coupling position.

*Motor key selecting controls*

Figure 23:
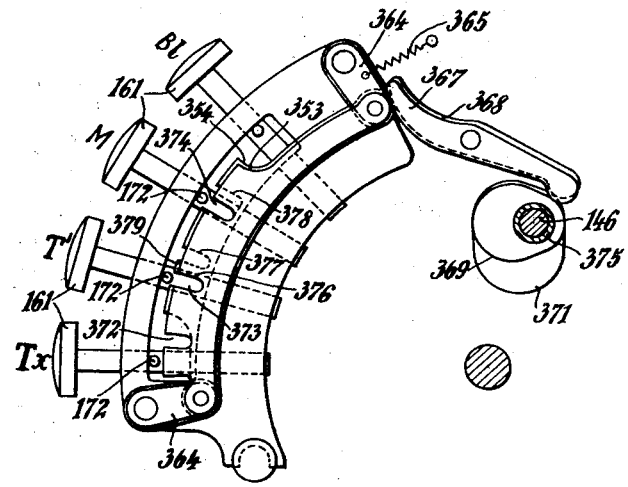
Figure 24:
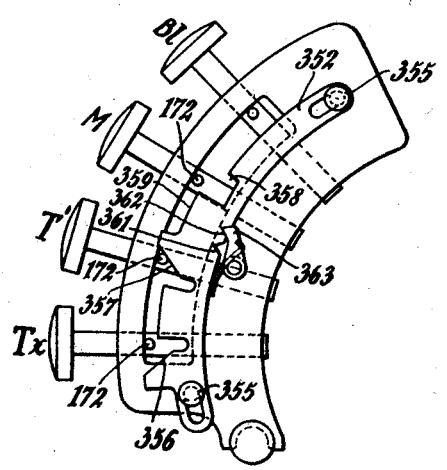

Besides the above-described key excluding means 163, Figure 19, and the two slides 221, Figure 19, and 225, Figure 20, the motor key board comprises three more slides 352, Figures 12, 24, 353, and 354, Figures 12, 23, which are adapted to lock the motor keys M, T', Tx during the individual recording operations. Slide 352, Figure 24, is shiftably mounted on pins 355 and by two slope faces 356, 357 directed toward one another it co-operates with the key pins 172 of the keys T' and Tx, and by a recess 358 and a locking edge 359 with the key pin 172 of the motor key M. On its rear narrow face slide 352 has two notches 361, 362 adapted to be engaged selectively by a spring-actuated locking pawl 363. In the normal position of the machine the slide 352 assumes the lower end position illustrated in Figure 24, in which pawl 363 engages notch 362 while key M is released by recess 358. Upon key T' being depressed, slide 352 is shifted upwards due to the pin 172 engaging the slope face 357, the locking edge 359 arriving below the pin 172 of key M and locking the latter until slide 352 is returned to normal position when key Tx is depressed and acts by its pin 172 on the oppositely inclined face 356. It will be seen, that owing to this locking arrangement a machine operation released by key T', can only be followed by an operation of the same kind or by an operation released by key Tx (total taking from the main totalizer).

The two locking slides 353, 354, Figure 23, are mounted on swing levers 364 and their upper ends under the action of springs 365 abut on intermediate levers 367, 368 the other ends of which abut on cams 369, 371. Cam 369 is directly connected with the actuating pinion 292, Figures 12, 21, of lever T. The locking slide 353 has three recesses 372, 373, 374 and assumes in the position of rest of lever T the position illustrated in Figure 23, in which the keys T'' and M are released, while key Tx is locked. Therefore, upon the introduction of an amount, when the motor keys M, T', Tx are released from the locking members 266, 267, Figure 19, by depressing the totalizer keys A to N, only one of the keys M, T' can be depressed, while key Tx remains locked by slide 353. Upon lever T being set to Zeroizing, the cam 369 rotates 180 degrees, whereby slide 353 is so shifted, that the keys M, T' are locked, but key Tx is released.

The cam 371 actuating the locking slide 354 is rigidly connected by a sleeve 375, Figures 23, 12 mounted on shaft 146 with the actuating pinion 299, Figure 22, 12, of the mode of operation lever O. The series of teeth 297, Figure 22, of this lever is somewhat longer than that of lever T, Figure 21, so that cam 371, Figure 23, assumes two different positions of rotation in the positions Reading off and Zeroizing of lever O. It may be noted, that in the first of these positions (Reading off) all the inclined faces 314, Figure 18, already have come to act. The slide 354 has three recesses 376, 377, 378, that co-operate with the keys M and T'. When lever O is in position of rest, the two keys M and T' are released by the recesses 376 and 378, when it is the Reading off position, key T' is locked by the locking face 379 intermediate the recesses 376 and 377, but key M is released by the recess 378 which has a corresponding width. When lever O is set to Zeroizing, slide 354 is farther moved downward, whereby key T' is released by recess 377 and key M is locked.

*Interlocks between levers A, and levers A and T*

In taking the total, only one totalizer is allowed to be thrown into gear, as only one amount differential mechanism is provided. A lever excluding mechanism must therefore be provided between the levers selecting the totalizer the total of which is to be taken, viz. the three levers A and the mode of operation lever T, which mechanism prevents more than one of the four levers from being moved out of position of rest.

Figure 26:
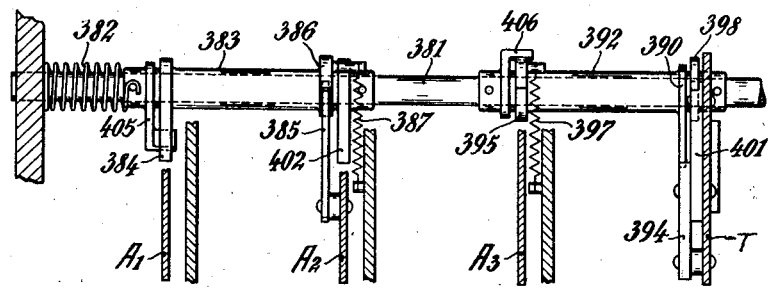

To this end a locking shaft 381, Figure 26, is arranged along the four levers, which shaft is rotatably mounted on the machine frame and influenced by a spring 382 that tends to rotate it in counter-clockwise direction, Figures 27 to 30. The left-hand portion of shaft 381, Figure 26, carries a sleeve 383, that in the plane of the first setting lever, denoted by A1, has a rigid locking arm 384, Figures 27, 26, and in the plane of a locking plate 385, Figures 28, 26, connected to the setting lever A2 a rigid arm 386. Under the action of a spring 387 the hook-shaped end of the arm 386 abuts on an upper rest face 388, Figure 28, of plate 385, the locking arm 384, Figure 27, being opposite a recess 389 of lever A1. Upon lever A2 being moved out of position of rest, the arm 386, Figure 28, is swung upward by face 388 against the action of spring 387 and sleeve 383 is so turned, that the locking arm 384 enters the recess 389, Figure 27, and thus locks lever A1. On the other hand, upon lever A1 being moved, lever A2 is locked by a locking arm 391 of lever A1 arriving below the locking arm 384 and thus securing sleeve 383 against being turned, so that the arm 386 impedes the passage of the rest face 388.

A similar mutual excluding arrangement is provided between the levers T and A3. To this end a sleeve 392 is mounted on the right-hand portion of shaft 381, Figure 26, which sleeve co-operates by a locking arm 390 with a rest face 393, Figure 30, of a locking plate 394 connected to lever T, and by an arm 395, Figure 29, with a rest face 396 of lever A3. Under the action of a spring 397, Figure 26, the arm 395, Figure 29, is held engaging the rest face 396.

Furthermore lever T is connected to lever A2 by a mutual excluding arrangement. The shaft 381, Figure 26, has rigid on its right-hand end an arm 398 that under the action of a spring 382 abuts on a rest face 399 of another locking plate 401 connected to lever T. In the plane of lever A2 shaft 381 has rigid on it a locking arm 402, Figure 28, co-operating with a recess 403 and a locking face 404 of lever A2. By moving lever T thus the levers A2 and A3 are locked and by moving one of the levers A2 and A3 lever T is fixed.

The further required mutual locking is obtained by two lug arms 405 and 406, Figure 26, rigid on shaft 381. Arm 405, Figure 27, engages the locking arm 384, arm 406, Figure 29 engages arm 395.

The function of the whole described excluding means is as follows:

Upon lever A1 being moved, sleeve 383 is locked by locking arm 384, Figure 27, and locking face 391, also shaft 381 is locked by the arm 405. Arm 386, Figure 28, thus prevents the motion of lever A2 and arm 398, Figure 30, that of lever T. As arm 395, Figure 29, cannot give way due to arm 406 being fixed, also lever A3 is locked.

Upon lever A2 being moved, on the one hand sleeve 383 is moved and locks lever A1, on the other hand shaft 381 is locked by the locking face 404, Figure 28, arriving below the locking arm 402 of shaft 381. By the fixation of shaft 381 also the levers A3 and T are locked. Upon lever A3 being moved, sleeve 392 and shaft 381 are moved in common by arm 395, Figure 29, and lug arm 406, the consequence of which is that lever T is locked by sleeve 392, lever A2 is locked by locking arm 402, Figure 28, of shaft 381, and lever A1 is locked by locking arm 384 that is pulled in by the lug 405.

Finally, upon lever T being moved, shaft 381 is turned by arm 398 and sleeve 392 is locked by locking arm 390. By shaft 381 turning, the levers A1 and A2 are locked through the intermediary of the locking arms 384, Figure 27, and 402, Figure 28. By locking sleeve 392 by means of arm 395, Figure 26, lever A3 is locked.

It will be seen from the foregoing, that only one of the levers A1, A2, A3, T can be set at any time, so that only one of the totalizers of the main totalizer is able to be thrown into operative relation with certainty, when totals are to be taken. The advantage of this excluding arrangement over other devices operating e. g. with transversely shiftable sliding members resides in the fact, that only swinging elements are provided, the manufacture of which requires a less degree of accuracy.

Mode of operation

In the "normal state" of the machine, that is in the state the machine assumes after a complete recording operation has been finished, all setting means except the amount keys 10 and motor key Bl are in locked state. In particular the following locks are in effect: the totalizer keys 1 to 18 are locked by the members 239, 241, Figures 16, 17; the totalizer keys A to N are locked by 254, 253, Figure 18; the motor keys M, T' are locked by 267, 266, Figure 19; the levers A are locked by the pawls 324, Figure 25; and the mode of operation levers T and O are locked by the pawls 282, 283, Figures 21, 22. The normal state of the machine is illustrated in Figure 1, in which like in Figures 2 to 7 all locked setting means are marked by hatching.

By depressing:
(a) An amount key an operation with introduction of an amount is started.
(b) The motor key Bl an operation for taking a total is started.

Referring to (a): By depressing an amount key 10, Figure 2, the remaining keys 10 of the same row are locked by the appurtenant excluding members 163, 172, and the motor key Bl is locked by lug 237, Figure 20. Furthermore the release of the locking members 241, 239, Figures 16, 17, of the totalizer keys 1 to 18 takes place.

Figure 3:
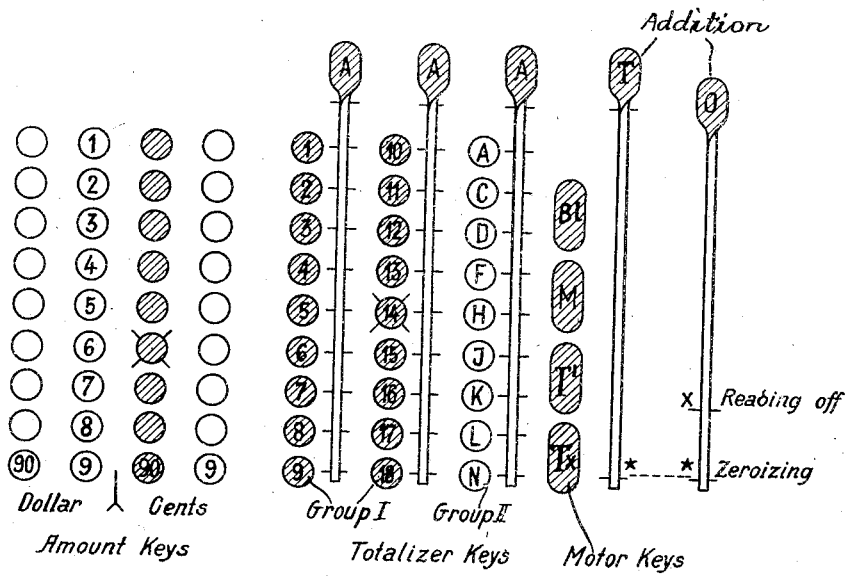

By depressing a totalizer key 1 to 18, Figure 3, all remaining totalizer keys 1 to 18 are locked, viz. by the excluding members 163, 172 of the respective row and by the mutual blocking members 247, 248, 251, Figures 16, 17, arranged between the two totalizer key rows 1 to 9 and 10 to 18. Furthermore, the locking members 253, 254, Figure 18, of the totalizer keys A to N become inoperative.

Figure 4:
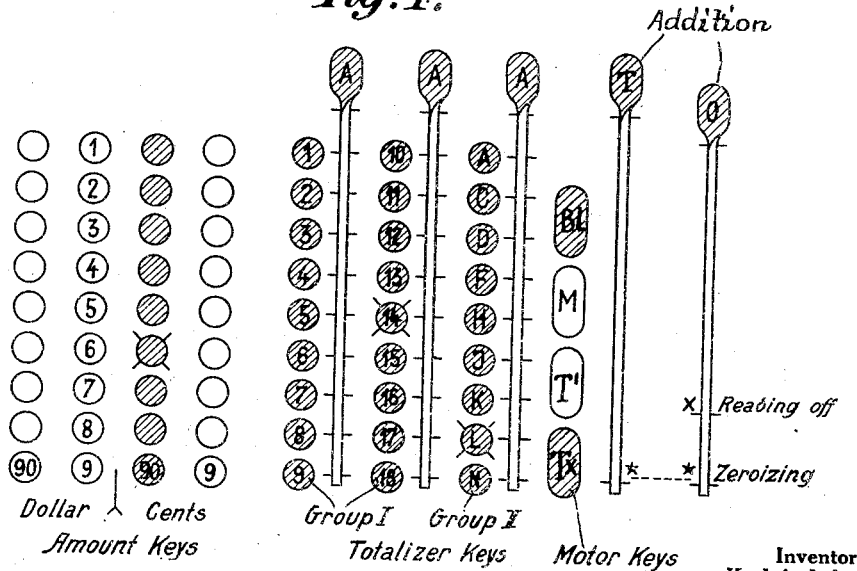

By depressing a totalizer key A to N, Figure 4, the remaining keys A to N are locked by the appurtenant excluding members 163, 172, and the locking members 266, 267, Figure 19, of the motor keys, M, T', Tx become inoperative. Of these keys the key Tx is still locked by the slide 353, Figure 23, so that the operator now is able only to depress, 1: the motor key M or, 2: the motor key T'.

Referring to a.1: The motor key M is depressed, when a normal adding amount, e. g. an individual tax amount, is to be introduced in the machine, in which case the amount keys 10 not yet locked are locked by the locking arms 276, Figure 15, whilst motor key T' is locked by the excluding members 163, 172 of the motor key board, and the release of the machine operation is effected by the releasing lever 224, Figure 19, being rocked by slide 221. During this machine operation the amount set by the amount keys is transferred additively to the two special totalizers allotted to the depressed totalizer keys 1 to 18 and A to N. The main totalizer remains out of operative relation, as by depressing motor key M the step-notched drum 179, Figure 12, is adjusted to throw-out position. At the end of the machine operation the depressed keys are released in known manner, the blocking members returning to initial position under the action of their springs, so that the normal state of the machine is reestablished and operations of the same nature may be repeatedly made as often as desired.

Referring to a.2: The motor key T' is depressed instead of motor key M, when the total of a plurality of individual amounts to be successively introduced is to be taken, e. g. when a person pays at the same time several tax amounts of different kinds.

By the depression of motor key T' the amount keys 10 not yet locked are locked by the locking arms 276, Figure 15, the motor key M is locked by the excluding members 163, 172, the slide 352, Figure 24, is shifted into the upper end position, and the machine operation is released by slide 221 and releasing lever 224, Figure 19.

During this operation of the machine the amount set is transferred additively to the special totalizers corresponding to the two depressed totalizer keys. As, upon motor key T' being depressed, the drum 179, Figure 12, is moved into throw-in position, the amount is additively transmitted also to the main totalizer. At the end of the operation the depressed key is released, the blocking means returning to initial position. Only slide 352, Figure 24, remains in its upper end position, in which key M is locked. Now there only can follow either another operation started by key T'—this will be the case, when a further amount is to be added to the composed first amount,—or an operation which is started by key Tx, when the total of the said composed amount is to be ascertained. It will be seen from this statement, that a new composed amount total cannot be effected before the first composed amount total has been withdrawn from the main totalizer by Zeroizing.

Referring to (b): In the normal state of the machine the motor key Bl is depressed instead of an amount key, when a machine operation for taking totals is to be prepared, that is when either an end total (zeroizing) from a special totalizer or the grand totalizer or a sub-total (reading off) from a special totalizer is to be taken.

Upon depressing the motor key Bl, the amount keys 10 are locked by the upper end 238 of slide 225, Figure 20, due to shaft 228 being locked by lug 237, and the operation is started by slide 225. During this machine operation the setting members 47, Figure 9, of the amount key boards, the setting members 110, Figure 12, of the totalizer key boards and the setting member 192 of the motor key board are zeroized, if they are not in zero position already from the preceding machine operation. By the setting member 192, Figure 21, of the motor key board arriving in zero position, the group of pawls 282, 283, Figures 21, 22, is lifted by pin 286, Figure 21, whereby the two mode of operation levers T and O are released. At the end of the idle operation the motor key Bl is released. Besides the levers T and O the amount keys and the motor key Bl have been released. Now the depression of key Bl would merely cause another idle operation, that is no other change, a depression of an amount key 10 and the simultaneous setting of one of the levers T and O is prevented by the locking members 317, 316, Figure 8.

The two mode of operation levers T and O can be set to three different positions.

Referring to b.1: Lever T is set to Zeroizing, Figure 5. This is the case, when the total is to be taken from the main totalizer. This total may be either the total of a composed amount at the end of an intermediate record, or the grand total from all individual totalizers or from a group thereof, after the sub-totals of the totalizers have been transferred to the main totalizer, as hereinafter described in paragraph b3.

Figure 5:
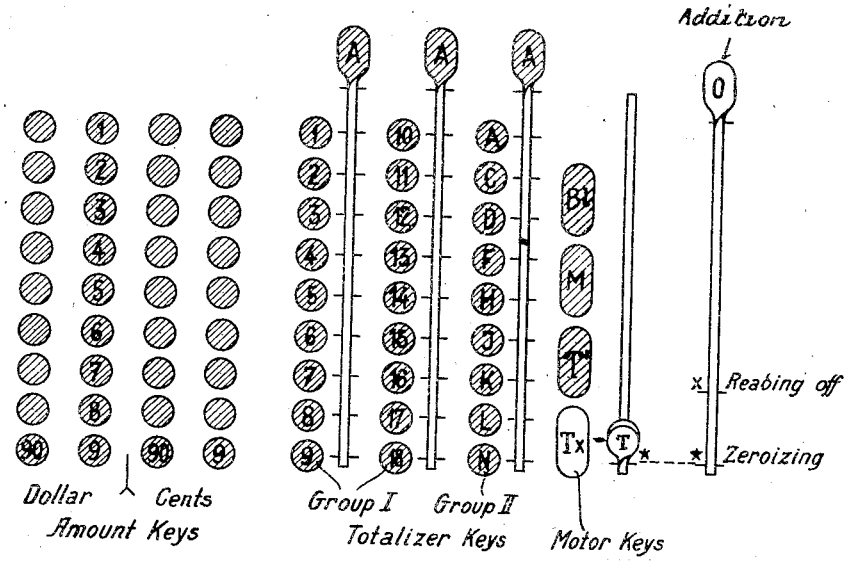
Figure 6:
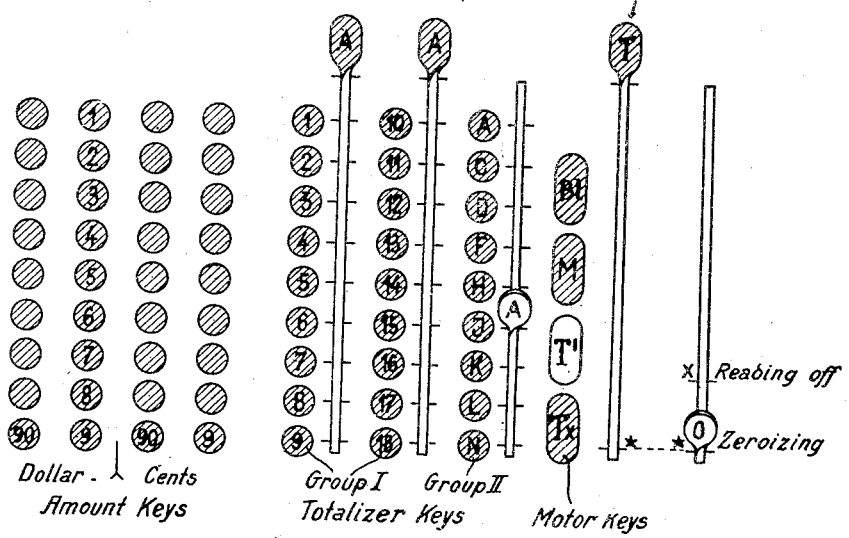
Figure 7:
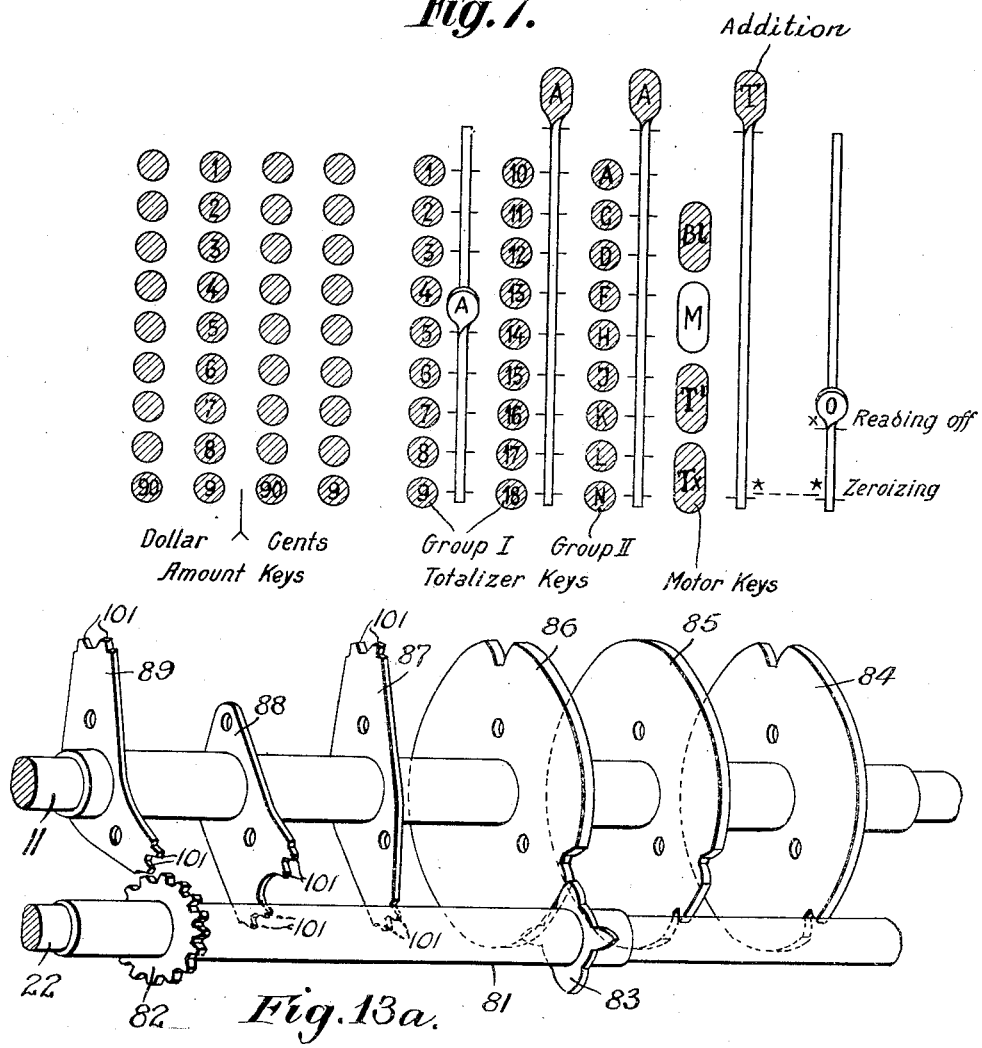

The adjustment of lever T to Zeroizing, Figure 5, causes the rotation of shaft 230, Figure 12, whereby all zero stop pawls are lifted by the cams 306 to 309 and the differential members of the key boards are released as if a key had been depressed in each key board. At the same time the mutual blocked state is successively eliminated by the motion of the zero stop pawls. This causes, however, in this case only the locking members 266, 267 of the motor key board to become inoperative, Figure 19, because no amount and totalizer keys are depressed in taking the total from the main totalizer. These keys are locked by the locking bars 315, Figures 8, 10 except the totalizer key row 10 to 18, which is locked by the excluding mechanism and the members 241, 251, Figure 17.

Although the levers A, Figure 25, are released by the pawls 324, they are notwithstanding held locked by the lever excluding mechanism, Figures 26 to 30, as lever T has been moved out of its position of rest. By the hooks 332, Figure 25, also the setting members 110 of the totalizer key boards remain locked. The companion differential members 319, Figure 8, are blocked by arm 321 and the motor keys M and T' are locked by the motion of slide 353, Figure 23, while motor key Tx is released. The setting member 192 of the motor key board has been rocked into the throw-in position directly by pin 349, Figure 21.

By depressing key Tx the slide 352, Figure 24, is returned to its lower end position, so that in a subsequent machine operation the motor key M may be depressed again. Finally, that operation is started by the slide 221, Figure 19, by which the total is taken from the main totalizer and the latter is zeroized. At the end of the operation the key Tx is released. Upon the lever T now being moved back by hand into position of rest, the normal state of the machine is re-established, in which only the amount keys and motor key Bl are released. Any desired new recording operation may now begin.

Referring to b.2: Lever O is set to Reading off, Figure 7.

This is the case, when the amount just accumulated in one of the totalizers 1 to 18 or A to N is to be ascertained. The setting of lever O causes the zero stop pawls to rock in the same manner as with lever T and thereby the amount and totalizer keys and motor key Bl to be locked, and further causes the blocking members 267, 266, Figure 19, of the motor key board to become inoperative, the amount differential members to be released, and their companion members to be locked. Furthermore, the levers A are released by the pawls 324, Figure 25, the setting members 110 of which levers at first remain locked by the hooks 332. By the partial rotation of cam 371, Figure 23, slide 354 is shifted in such a manner, that the key T' is locked by face 379, and key M is released, while key Tx remains locked by slide 353.

One of the levers A is set to key 102, allotted to the totalizer from which the total is to be taken. By setting this lever A, at first the other levers A and lever T are locked by the excluding mechanism, Figures 26 to 30. Furthermore, the appurtenant setting member 110, Figure 25, is released by the lever 326 being lifted by pin 327, and is coupled with lever A by the pinion 141, so that the rider shaft 61, Figure 11, of the respective totalizer packet I to III is shifted to select a totalizer.

By depressing the motor key M that machine operation is started, by which the sub-total from the totalizer selected by the respective lever A is taken. A simultaneous throwing-in of the main totalizer does not take place herewith, as the step-notched drum 179, Figure 12, is set to throw-out position by key M.

All these operations are recorded on the control strip of the machine.

At the end of the machine operation the release of key M takes place. As soon as the levers A and O have been removed to position of rest, the normal state of the machine is re-established. If lever O is not returned, a machine operation of the same kind with selection of another individual totalizer may follow.

Referring to b.3. Lever O is set to Zeroizing, when the end total is to be taken from one of the totalizers 1 to 18 or A to N and the amount of this total is to be transferred to the main totalizer. This is done at the end of the business period, to ascertain the grand total of the totalizers or of a group thereof. By comparing the grand total from the totalizers 1 to 18 with the grand total from the totalizers A to N, which must agree with the former, it may be determined, whether the machine has functioned correctly.

When lever O is set to Zeroizing and one of the levers A is set to a totalizer, the machine is in the same state as if lever O had been set to Reading off, except that it is not key M but key T' that is released by slide 354, Figure 23. By depressing key T' the slide 352, Figure 24, is shifted upwards, so that key M is locked and the following machine operation can be started only by key T' or Tx. The start of that operation thereby takes place, in which the totalizer selected by the lever A is zeroized and the amount of its total is transferred to the main totalizer. At the end of the operation key T' is released. As long as lever O is in Zeroizing position, the group of pawls 382, 383, Figures 21, 22, is held in releasing position by pin 287, so that lever T can be brought to Zeroizing position without insertion of an idle operation, to take the end total from the main totalizer, as described in paragraph b.1. The end total is taken from the main totalizer, after the totals from all totalizers of a group have been transferred to the main totalizer.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, a main totalizer, a plurality of special totalizers, a setting lever adapted to determine the mode of operation of said main totalizer, a second setting lever adapted to determine the mode of operation of said special totalizers, a plurality of machine-releasing keys, a differentially actuated member co-operating therewith, pawls adapted to lock said setting levers, and connections between said locking pawls and said differential member for making said locking pawls operative and inoperative in dependence upon the adjustment of said differential member.

2. In a machine of the class described a main totalizer, a plurality of special totalizers, a setting lever adapted to determine the mode of operation of the main totalizer, a second setting lever adapted to determine the mode of operations of the selected special totalizers, a plurality of machine-releasing keys, a differentially actuated member adapted to co-operate therewith, pawls adapted to lock said setting levers in their position of rest, a releasing key for idle operations for the purpose of preparing total taking operations among said machine-releasing keys, and connections between said locking pawls and said differential member adapted to make inoperative said locking pawls upon executing an operation of the machine released by the idle operation releasing key.

3. In a machine as specified in claim 2, a rigid connection between said locking pawls rotatably arranged on a shaft, a pin on each setting lever each co-operating with one of said pawls, a shoulder on the differential member, and an arm fixed to one of the pawls and co-operating with said lug so as to rock the pawls into inoperative position upon the differential member being adjusted in a position corresponding to the releasing key for idle operations.

4. In a machine of the class described manipulative means, locking means between the manipulative means for enforcing a definite sequence of manipulations, a setting lever adapted to determine the mode of operation of the machine, a pinion, a driving means between the pinion and said setting lever, and connections between said pinion and said locking means adapted to differently place the latter in dependence upon the adjustment of said setting lever.

5. In a machine of the class described manipulative means, locking means between the manipulative means for enforcing a definite sequence of manipulations, an adjusting member for these locking means, two setting levers adapted to determine the mode of operation of different totalizers, and a differential gearing between said adjusting member and the two setting levers and adapted to adjust said locking means in dependence upon one of said setting levers being moved out of its position of rest.

6. In a machine of the class described amount keys, a main totalizer, a plurality of special totalizers, a set of differentially actuated members common thereto, a zero stop pawl for each differential member and adapted to lock each differential member if no appropriate key is depressed, a machine-releasing key for idle operations, a setting lever adapted to determine the mode of operation of the main totalizer, a second setting lever adapted to determine the mode of operation of the selected special totalizers, and connections between said setting levers, said keys and zero pawls and adapted to lock, upon one of said setting levers being moved out of its position of rest, said keys and to render inoperative said zero pawls.

7. In a machine of the class described amount keys, totalizer keys, machine-releasing keys, differentially actuated members co-operating with said amount keys, a pawl for each differential member adapted to lock the differential member in position of rest, locking means between said keys adapted to enforce a definite sequence of depressing the different kinds of keys, and connections between the last-mentioned locking means and said pawls whereby upon moving the pawls in their releasing position said locking means are rendered inoperative.

8. In a combination as specified in claim 7, key detents adapted to co-operate with said keys and pivotally connected to said pawls whereby upon releasing the pawls said keys are locked.

9. In a machine of the class described amount keys, a plurality of totalizers, a set of differentially actuated members common thereto, pawls adapted to co-operate therewith, totalizer engaging keys, machine-releasing keys, locking means for enforcing a depression of the different kinds of said keys in the sequence, amount keys, totalizer keys of the first group, totalizer keys of the second group, and machine-releasing keys, said locking means being connected to said pawls, a setting lever adapted to determine the mode of operation of the selected totalizers, a shaft connected to said setting lever and bearing cams adapted to co-operate with the different pawls of the amount and totalizer keys and causing the pawls to be released upon the setting lever being moved out of position of rest in a sequence like that of the depression of the different kinds of keys, for the purpose of releasing the machine-releasing keys.

10. In a machine as specified in claim 9, one group of totalizer keys being arranged in two rows, a mutual locking device between the two rows, and a yielding connection between the two arms of one pawl so as to enable this pawl to be released unhindered by said mutual locking device.

11. In a machine of the class described a plurality of totalizers, actuators therefor, totalizer setting levers for selecting any of the totalizers for engagement with the actuators for total taking operations, a manipulative means for determining the mode of operation of the machine, locking means for said totalizer setting levers adapted to lock them in their position of rest, a mutual locking device between said setting levers and said manipulative means, and connections between said locking means and said manipulative means and adapted to release said totalizer setting levers upon adjusting said manipulative means and to lock them again through said mutual locking device.

12. In a machine of the class described a plurality of totalizers, actuators therefor, a totalizer setting lever for selecting any of the totalizers for engagement with the actuators for total taking operations, a manipulative means for determining the mode of operation of the machine, a shaft connected thereto, a cam fixed to the shaft, and a locking member for said setting lever adapted to co-operate with said cam under the influence of a spring whereby the locking member is held locking the setting lever in the normal position and is put in releasing position upon moving said manipulative means out of position of rest.

13. In a machine of the class described a manipulative means for determining the mode of operation of the machine as addition and total taking, a differentially actuated member, a shaft connected to said manipulative means, a cam fixed to the shaft, and a locking member for said differential member adapted to co-operate with said cam under the influence of a spring whereby the locking member is put in its locking position to lock the differential member in the position of rest upon moving said manipulative means out of position of rest.

14. In a machine as specified in claim 13, a plurality of totalizers, actuators therefor, means for selecting any of the totalizers for engagement with the actuators for total taking operations, a totalizer setting lever connectable with the totalizer selecting means to operate the selecting means, and connections between the setting lever and said locking member whereby the locking member when in locking position is put again into releasing position upon moving the setting lever out of normal position.

15. In a machine as specified in claim 13, a plurality of totalizers, actuators therefor, means for selecting any of the totalizers for engagement with the actuators for total taking operations, a totalizer setting lever connectable with the totalizer selecting means to operate the selecting means, a lug fixed to said setting lever, a bevel face on said locking member adapted to co-operate therewith whereby the locking member when in locking position is put again into releasing position upon moving the setting lever out of position of rest.

16. In a machine of the class described a main totalizer, a plurality of special totalizers, a set of differentially actuated members common thereto, machine-releasing keys controlling the selection of a totalizer, a setting lever determining the mode of operation (addition, taking sub-totals and totals) of the selected special totalizers, and a locking slide for said releasing keys connected with said setting lever and adapted to lock all the keys except the key which controls the selection of a special totalizer, upon adjusting said setting lever into its sub-total taking position.

17. In a machine of the class described amount keys arranged in different rows, a locking member in each row adapted to lock all keys of a row upon one of them being depressed, spring-influenced pawls adapted to co-operate with said locking members to maintain the locking members in locking positions, a retaining member adapted to normally hold said pawls in inoperative position, and machine-releasing keys connected to said retaining member to release the pawls to drop behind said locking members so as to lock all keys in the rows in which no key has been depressed, upon depressing a releasing key.

18. In a machine of the class described a plurality of setting levers, a locking device between them adapted to lock, upon moving one of them out of normal position, all other levers in position of rest, said device comprising a plurality of locking members each adapted to co-operate with two setting members and to be rocked by one of the two levers and to be locked by the other one.

19. In a machine of the class described four setting levers, a locking shaft, a first locking member thereon adapted to be locked by moving the first setting lever and to lock thereby the second setting lever and to be rocked by moving the second setting lever and to lock thereby the first setting lever, a second locking member on said shaft, adapted to be locked by moving the fourth setting lever and to lock thereby the third lever and to be rocked by rocking the third setting lever and to lock thereby the fourth setting lever, two rigid arms on said shaft each adapted to co-operate with one locking member so as to lock the shaft upon locking the first locking member and to lock thereby the second locking member and to rock the shaft upon rocking the second locking member and to rock thereby the first locking member, and two locking arms rigid to said shaft, one of them being adapted to be locked by a setting lever of the first locking member, and the other being adapted to be rocked by a setting lever of the second locking member.

KARL AUGUST LEHMANN.
ERNST BREITLING.